United States Patent [19]

Latta

[11] Patent Number: 4,823,573
[45] Date of Patent: Apr. 25, 1989

[54] STEERING WHEEL LOCK

[76] Inventor: Lee M. Latta, 1922 Rodeo Rd., Los Angeles, Calif. 90018

[21] Appl. No.: 225,883

[22] Filed: Jul. 29, 1988

[51] Int. Cl.$^4$ .............................................. B60R 25/02
[52] U.S. Cl. ........................................ 70/209; 70/226
[58] Field of Search .................... 70/225–227, 70/209, 211, 212, 14, 30, 49, 237

[56] References Cited

U.S. PATENT DOCUMENTS

| | | | |
|---|---|---|---|
| 1,395,532 | 11/1921 | Tilden | 70/209 |
| 1,421,401 | 7/1922 | Byers | 70/212 |
| 1,438,656 | 12/1922 | Mahoney | 70/227 |
| 1,443,285 | 1/1923 | Smith et al. | 70/212 |
| 1,467,353 | 9/1923 | Childress | 70/227 |
| 1,495,820 | 5/1924 | Tierney | 70/416 |
| 3,138,036 | 6/1964 | Carson | 70/211 |
| 3,462,982 | 8/1969 | Moore | 70/209 |
| 3,742,743 | 7/1973 | Stoyanovitch | 70/225 X |
| 3,815,391 | 6/1974 | Latta | 70/209 |
| 4,103,524 | 8/1978 | Mitchell et al. | 70/209 |

FOREIGN PATENT DOCUMENTS

| | | | |
|---|---|---|---|
| 804404 | 4/1951 | Fed. Rep. of Germany | 70/212 |
| 2718291 | 10/1978 | Fed. Rep. of Germany | 70/211 |
| 936144 | 2/1948 | France | 70/212 |
| 1127524 | 9/1968 | United Kingdom | 70/209 |
| 2039840 | 8/1980 | United Kingdom | 70/209 |

Primary Examiner—Lloyd A. Gall
Attorney, Agent, or Firm—Bruce L. Birchard

[57] ABSTRACT

A steering wheel locking mechanism comprises an elongated bar. One end of the bar is positioned adjacent the center of the steering wheel. An arcuate boot having the same radius of curvature as the curvature of the steering wheel and the same cross sectional curvature as the curvature of the cross section of the steering wheel is mounted over an arcuate segment of the periphery of the steering wheel. The concave surface of the boot embraces the outer periphery of the steering wheel. The steering wheel has at least one spoke connecting the steering wheel shaft at the center of the steering wheel with the periphery of the steering wheel. A portion of the elongated bar lies over the spoke. A chain is welded to the bar and is wrapped around the spoke and is attached to the chain lock with the concave surface of the boot embracing the outer surface of the steering wheel. The length of the bar is such that the bar extends beyond the periphery of the steering wheel a distance such that if an attempt is made to turn the steering wheel with the steering wheel locking mechanism in place, the end of the bar remote from the steering wheel will engage a portion of the interior of the motor vehicle or the driver, thus preventing further rotation of the steering wheel and, hence, preventing steering of the motor vehicle.

4 Claims, 1 Drawing Sheet

STEERING WHEEL LOCK

This invention relates to an anti-theft steering wheel locking device for preventing the theft of motor vehicles such as cars, trucks, boats, and aircraft.

BACKGROUND AND BRIEF SUMMARY

The rising incidence of crime has corresponded to the increase in thefts of cars, boats, and aircraft. Many devices have been designed to prevent this. Some involve disabling the ignition system of the vehicle. Car thieves get quite proficient in learning how to overcome them in a short time. Other devices lock the steering wheel, by locking one end of a long metal bar to the steering wheel and the opposite end to the foot pedal, or locking a metal bar to the diametrically opposite sides of the steering wheel in such a way that the steering wheel cannot be turned.

However steering wheels are usually made from some sort of material which can be easily and quickly cut by a hacksaw, so that even if a part of a locking bar is locked to the steering wheel, a thief can quickly cut through the steering wheel and remove the locking device and thus be able to drive away. For this reason current designs of steering wheel locks give the illusion of protection but do not really protect the vehicle from thieves.

It is noted that the steering wheel locking mechanism is principally applied to cars and trucks, but it is to be understood that the principles of this invention can be applied to all kinds of vehicles, such as boats and aircraft.

What is needed therefore and comprises an important object of this invention is to provide a steering wheel lock which cannot be removed even though a section of the steering wheel is cut away.

This and other objects of this invention will become more apparent when better understood in the light of the accompanying specification and drawings wherein.

Figure 1:
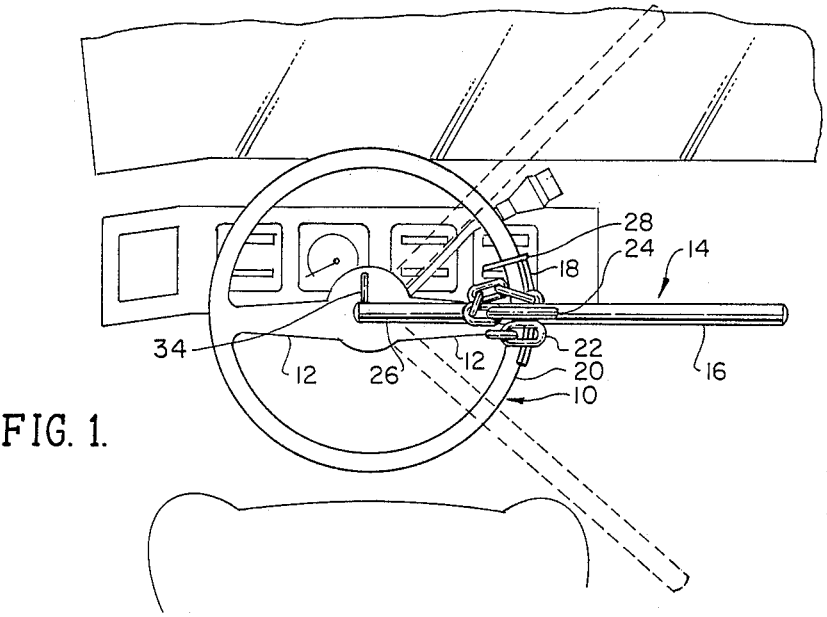
FIG. 1 is an elevational view of the interior dashboard vehicle showing the steering wheel and the steering wheel locking mechanism attached to the steering wheel spoke.

Referring now to FIG. 1 of the drawing, an automobile steering wheel indicated generally by the reference numeral 10 comprises a plurality of spokes 12 which are attached to the periphery of the circular wheel and to the steering wheel shaft.

Figure 2:
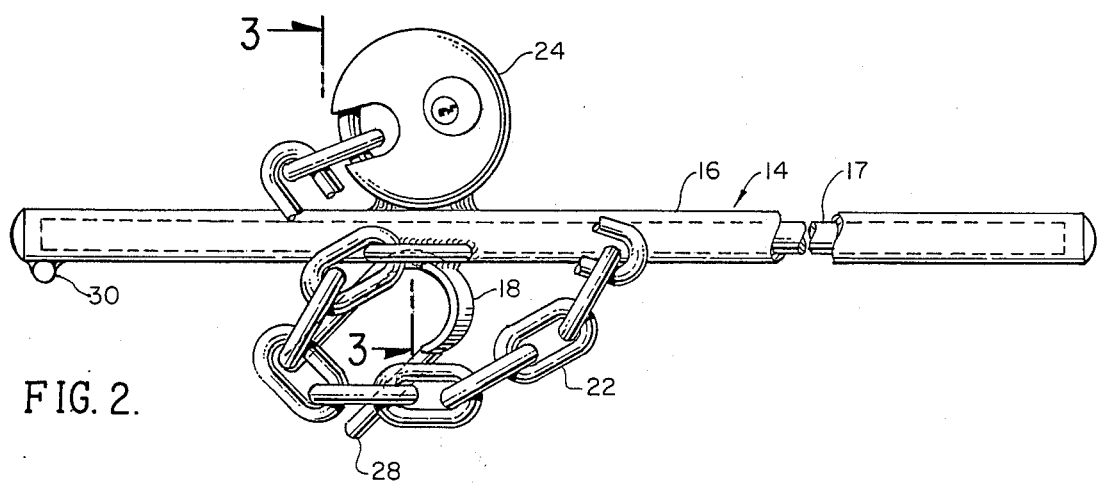
FIG. 2 is an elevational view of the steering wheel lock displaying the bar, the chain and the chain lock and showing the interior of the bar.

A steering wheel locking mechanism 14, see FIG. 2 comprises a hollow elongated bar 16. An arcuate metal boot 18 which has the same curvature as the curvature of the steering wheel and which is also arcuate in cross section with the same curvature as the curvature of the cross section of the steering wheel is welded to the bar 16 and fits over an arcuate segment 20 of the periphery of the steering wheel. One end of the case hardened chain 22 is welded to the bar 16 and is designed to be wrapped around a spoke 12 of the steering wheel 10. The opposite end of chain 22 is designed to be interlocked with a chain lock 24, see FIG. 2.

The spoke 12 of the steering wheel is covered by bar 16 which as seen in FIG. 1, lies over the spoke 12. The remaining portion of the bar extends beyond the periphery of the steering wheel for reasons to be described hereinafter.

Figure 4:
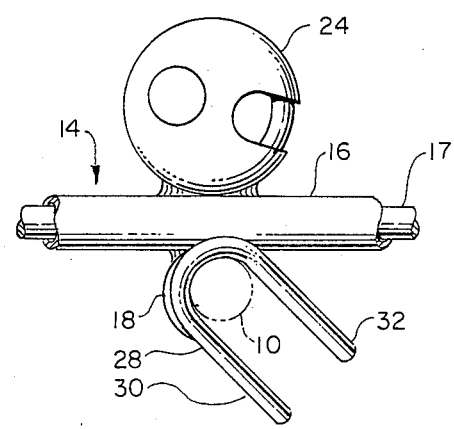
FIG. 4 is an enlarged view of the lock welded to the bar and showing the relationship between the stabilizer and the bar.

A U-shaped stabilizer 28 is welded to the end of the metal boot 18, and the legs 30 and 32 thereof embrace the periphery of the steering wheel, see FIG. 4. Legs 30 and 32 thus prevent the boot 18 from rotating about the periphery of the steering wheel. Any such rotation would enable the inner portion of the bar 16 to pivot upwardly to a position perpendicular to the spoke 12 so that a saw could be inserted between the bar and the spoke to cut the spoke, which would free the steering wheel.

To further prevent this from happening, a steel rod 34 is welded in a position transverse to the end of the bar 16. This rod is mounted over the center of the steering wheel 10, see FIG. 1. With this structure, sideward and downward force exerted on end portion 26 of bar 16 cannot cause the bar 16 and the rod 34 to be rotated about steering wheel 10 so that end portion 26 could be rotated downwardly and the portion of the bar 16 which would normally produce interference with a portion of the car or with the driver cannot be rotated upwardly out of an effective position. Therefore, exposure of spoke 12 to cutting is avoided. Effectively, the diameter of bar 16 has been enlarged to the extent of rod 34. This prevents the locking mechanism 14 including the bar 16 and the boot 18 from being rotated with inner end 26 moving, downwardly about the periphery of the steering wheel. This structure makes it much more difficult to cut the spoke 12 and the steering wheel rim 20 in an attempt to remove the steering wheel locking mechanism 14.

Figure 3:
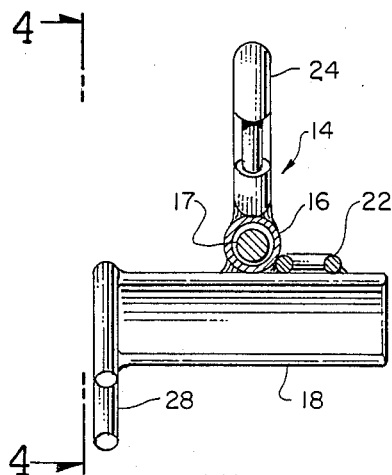
FIG. 3 is a sectional view taken on the line 3—3 of FIG. 2 showing the bar and its interior structure, the boot, and the stabilizer attached to the boot.

As shown in FIGS. 2 and 3, the bar 16 is hollow and a steel bar 17 is rotatably mounted inside the bar 16. With this structure, any attempt to saw through the outer bar 16 would be frustrated since the inner bar 17 would rotate freely. It is noted that the bar 16 is sufficiently long so that if the steering wheel were turned, the end portion of the bar 16 would strike the seats, doors, windows or the driver of the car making it impossible for a thief to steer the car.

It can be seen that with my improved steering wheel locking mechanism, the locking mechanism cannot be removed even if the steering wheel is cut both above and below the boot 18 since the locking mechanism will still be attached to a spoke and the portion of the periphery of the steering wheel protected by the steel boot 18.

From the foregoing it is clear that my steering wheel lock mechanism has overcome the disadvantages inherent in the prior art devices and that my invention has resulted in a steering wheel locking mechanism which is very difficult to remove or break so that theft of the automobile becomes very difficult.

While a particular embodiment has been shown and described, it will be apparent to those skilled in the art that variations and modifications may be made therein without departing from the true spirit and scope of my invention.

I claim:

1. A locking mechanism for the steering wheel of a vehicle, including:
   a rigid, hollow bar having first and second ends and a central portion, said bar having a length significantly exceeding the radius of the steering wheel to which it is to be applied;

an arcuate boot having a radius of curvature of the steering wheel to which it is to be applied and having a cross-sectional curvature corresponding to the cross-sectional curvature of such steering wheel, said boot being positioned on said bar a distance from said first end thereof corresponding to the outer radius of such steering wheel, whereby, when said boot is in firm engagement with the outer surface of said steering wheel, said first end of said bar lies over the center of the steering wheel to which it is applied;

said bar, in use, being positioned over one spoke of the steering wheel to which it is applied;

a chain lock fixedly carried by said bar proximate to the central portion thereof; and, a chain having a first end fixedly carried by said bar proximate the central portion thereof, having a second end free to pass around a proximate spoke of the steering wheel to which it is to be applied and having a length sufficient to permit said second end of said chain to be engaged by said chain lock;

said first end of said bar carrying a rod extending at right angles to said bar a distance approximately the radius of the central hub of the steering wheel to which the locking mechanism is to be applied.

2. Apparatus according to claim 1 in which said arcuate boot carries a U-shaped stabilizer at one extremity thereof.

3. Apparatus according to claim 1 which includes, in addition, a freely rotatable metal bar carried within said rigid, hollow bar.

4. Apparatus according to claim 1 in which said chain lock is selectively operable.

* * * * *